(12) United States Patent
Eventoff et al.

(10) Patent No.: US 10,352,788 B2
(45) Date of Patent: Jul. 16, 2019

(54) METALIZED POLYESTER FILM FORCE SENSORS

(71) Applicant: Sensitronics, LLC, Bow, WA (US)

(72) Inventors: Franklin N. Eventoff, Bow, WA (US); Justin M. Connelly, Bow, WA (US); James A. Holmes, Bow, WA (US)

(73) Assignee: Sensitronics, LLC, Bow, WA (US)

( * ) Notice: Subject to any disclaimer, the term of this patent is extended or adjusted under 35 U.S.C. 154(b) by 144 days.

(21) Appl. No.: 15/367,037

(22) Filed: Dec. 1, 2016

(65) Prior Publication Data

US 2017/0153153 A1 Jun. 1, 2017

Related U.S. Application Data

(60) Provisional application No. 62/261,671, filed on Dec. 1, 2015.

(51) Int. Cl.
*G01L 1/20* (2006.01)
*G06F 3/044* (2006.01)
*G06F 3/041* (2006.01)
*G06F 3/0338* (2013.01)

(52) U.S. Cl.
CPC ............ *G01L 1/205* (2013.01); *G06F 3/0338* (2013.01); *G06F 3/044* (2013.01); *G06F 3/0414* (2013.01); *G06F 2203/04101* (2013.01); *G06F 2203/04106* (2013.01)

(58) Field of Classification Search
CPC ....... G01L 1/205; G06F 3/0414; G06F 3/045; G06F 3/044
See application file for complete search history.

(56) References Cited

U.S. PATENT DOCUMENTS

| | | | | |
|---|---|---|---|---|
| 4,301,337 A | * | 11/1981 | Eventoff | H01H 1/029 200/5 A |
| 4,314,227 A | * | 2/1982 | Eventoff | B60C 23/0408 338/100 |
| 4,314,228 A | * | 2/1982 | Eventoff | H01H 1/029 338/114 |
| 6,964,205 B2 | * | 11/2005 | Papakostas | G01L 1/20 73/862.046 |

(Continued)

*Primary Examiner* — Freddie Kirkland, III
(74) *Attorney, Agent, or Firm* — K. David Crockett, Esq.; Paul J. Backofen, Esq.; Crockett & Crockett, PC

(57) ABSTRACT

Pre-loaded force sensitive input devices, force sensing resistors (FSR), are formed as a multiple membrane assembly that is capable of detecting low intensity pressure inputs and quantifying varying applications of pressure to the sensor surface. Pre-loading the force sensor elements results in a controlled amount of force between the two substrates causing a constant state of pre-load and eliminating the low-end or minimal pressure signal noise associated with unloaded sensors. Pre-loading the force sensing resistor sensor also enables the sensor to detect removal of low intensity pressure input such as might occur during theft of light weight articles placed in contact with the pre-loaded force sensor. Using an FSR or FSR Matrix Array will enable any handling of protected retail packaging to be detected and identified. A library of "touches" can be established that will yield cutting, ripping, twisting, etc. making the detection of a theft in progress more accurate.

8 Claims, 11 Drawing Sheets

(56) References Cited

U.S. PATENT DOCUMENTS

| | | | | |
|---|---|---|---|---|
| 8,607,651 B2* | 12/2013 | Eventoff | ............... | G06F 3/044 |
| | | | | 73/862.041 |
| 9,501,199 B2* | 11/2016 | Her | ............... | G06F 3/045 |
| 9,599,525 B2* | 3/2017 | Eventoff | ............... | G01L 1/205 |
| 9,690,413 B2* | 6/2017 | Filiz | ............... | G06F 3/0414 |
| 9,903,771 B2* | 2/2018 | Eventoff | ............... | G01L 1/2287 |
| 2005/0145045 A1* | 7/2005 | Papakostas | ............... | G01L 1/20 |
| | | | | 73/864 |
| 2016/0147352 A1* | 5/2016 | Filiz | ............... | G01L 1/18 |
| | | | | 345/173 |
| 2017/0184462 A1* | 6/2017 | Eventoff | ............... | G01L 1/2287 |
| 2017/0356812 A1* | 12/2017 | Madden | ............... | G01L 1/144 |

\* cited by examiner

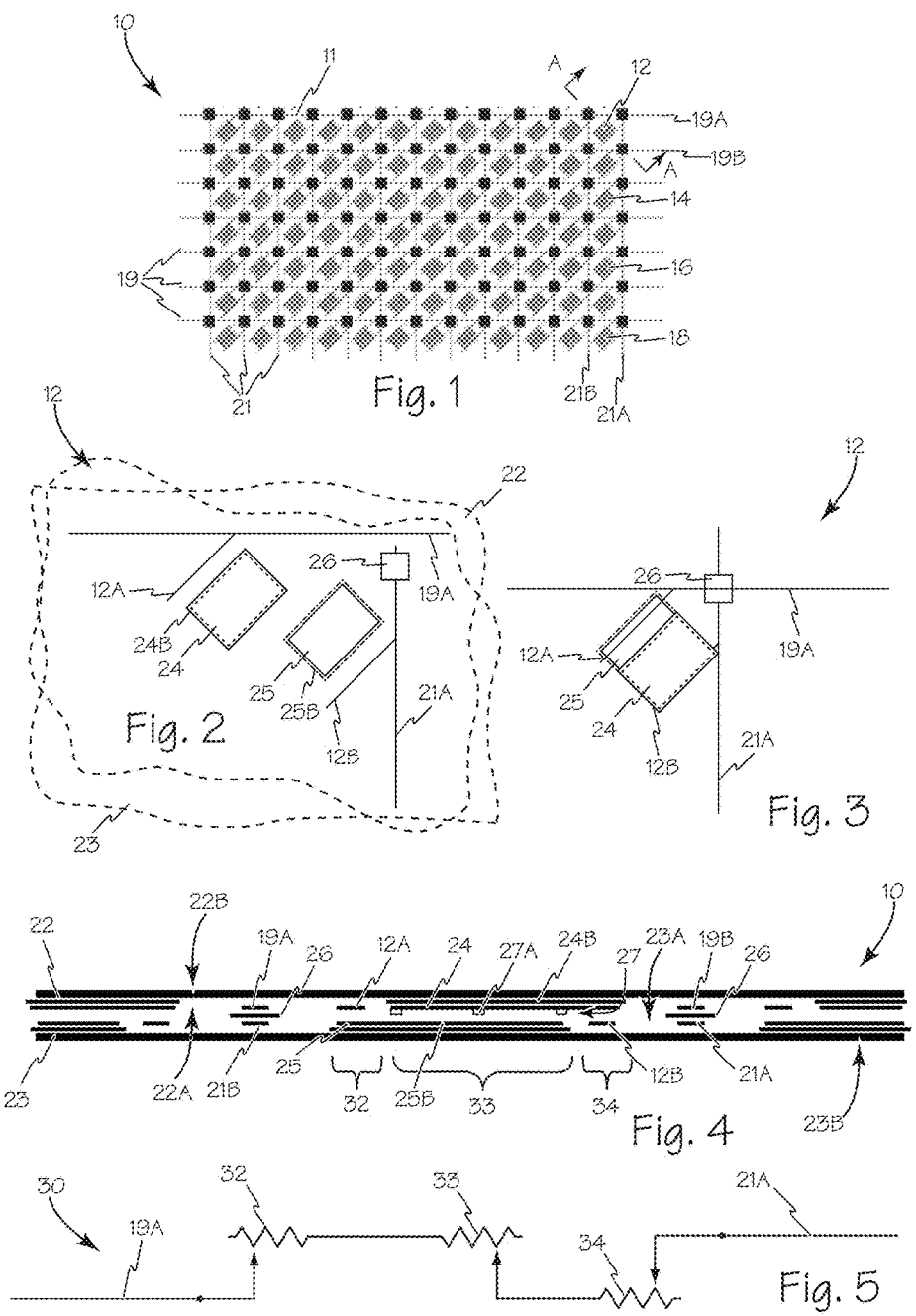

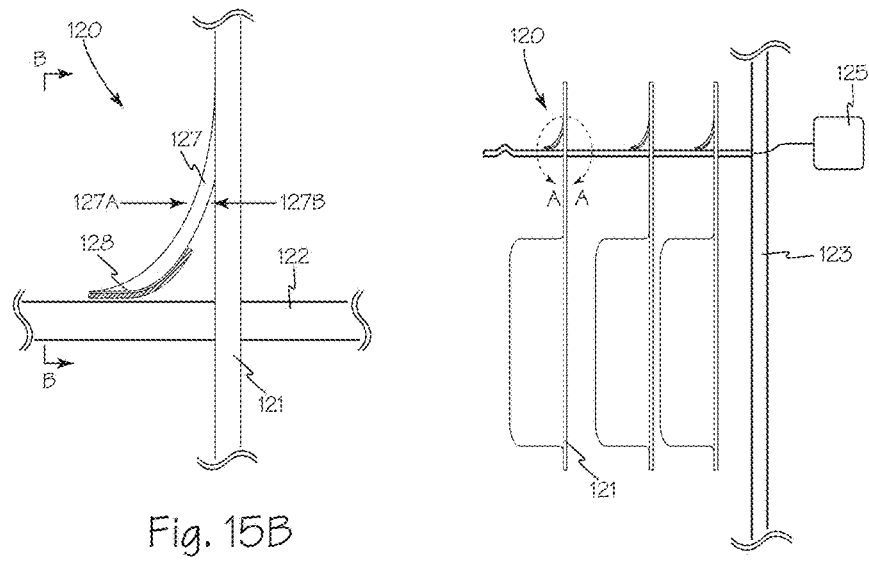
Fig. 15B
Fig. 15A
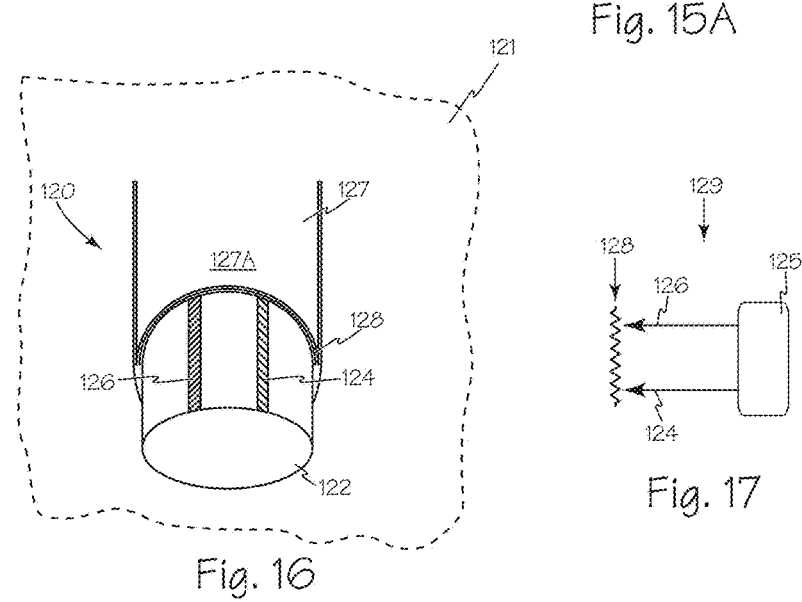
Fig. 16
Fig. 17

METALIZED POLYESTER FILM FORCE SENSORS

RELATED APPLICATIONS

This application claims priority to U.S. Provisional Patent Application 62/261,671 filed Dec. 1, 2015.

FIELD OF THE INVENTIONS

The present invention relates to the field of metalized polyester film force sensing resistor sensors.

BACKGROUND OF THE INVENTIONS

Modern interface controls are integrating electronic touch sensors to detect inputs. Conventional sensor surfaces based on force sensing resistors generally suffer from relative insensitivity to the application of very light input force or the removal of very light input force due to the materials used and the density of material necessary to achieve a functional sensor. Different sensors are currently being employed to prevent retail theft and many of the sensor configurations provide ambiguous signals or are too slow to be effective in theft prevention.

SUMMARY

The method and apparatus for pre-loaded force sensitive input devices, force sensing resistors (FSR), as disclosed below are formed as a multiple membrane assembly that is capable of detecting low intensity pressure inputs and quantifying varying applications of pressure to the sensor surface. Pre-loading the force sensor elements results in controlled amount of force between the two substrates causing a constant state of pre-load and eliminating the low-end or minimal pressure signal noise associated with unloaded sensors. Pre-loading the force sensing resistor sensors also enables the sensor to detect removal of low intensity pressure input such as might occur during theft of light weight articles placed in contact with the pre-loaded force sensor. Using an FSR or FSR Matrix Array will enable any handling of protected retail packaging to be detected and identified. A library of different "touches" can be established that will reflect cutting, ripping, twisting, etc. making the detection of a theft in progress more accurate.

A Force Sensing Resistor Smart-Peg may be used to support and display merchandise and identify theft when it is in progress. A FSR Smart-Peg combines a force sensing resistor element printed on cardboard merchandise packaging that may or may not be coated with plastic. The cardboard is stamped to form a curved leaf-spring which is oriented to maintain pre-loaded contact with electrodes of the Smart-Peg as the merchandise is displayed hanging from the Smart-Peg. This pre-loaded state will allow extra time for photographing any person lifting or moving the packaging to assist in identifying thefts in progress because as the product is lifted the sensor will remain in contact with the electrodes.

Force sensing resistor pre-load options include a fixed weight, adhesive, vacuum or differentially embossed upper and lower substrates causing a pre-load between the substrates. Another alternative for pre-loading FSR sensors is the use of a magnet or magnets on one or both substrates to control the intensity of the pre-load force. When used to generate a pre-load a magnetic field will allow a wide range of options.

A hybrid capacitive force sensing membrane assembly is formed with conductive particles by using two sheets of Polyester film such as polyethylene terephthalate (PET) or any other suitable clear or any opaque substrate coated with oriented patches of conductive particles on apposing surface of the parallel substrates along with an array of parallel conductors on each substrate. As a capacitive sensor, the electrical charge of a user's hand, finger or other extremity is sensed by the conductive layers of the sensor as a function of the input extremity's location and proximity to the sensor surface. As a force sensor, a user's input contact with the sensor surface is detectable when conductive elements on apposing substrates are forced into contact when the input force is applied. Increasing the applied force increases the area of contact between the substrates increasing conductance and increasing the number of conductive particles in the force sensing resistor elements making contact allowing the electrons to travel from one conductive trace on a first substrate through the contacting FSR element, such as carbon nanotubes (CNT) patches, to a perpendicular conductive trace on a second substrate.

The conductive traces and patches discussed below will generally refer to PEDOT or other highly conductive material, generally on the order of less than 50 ohms, as the deposited material. Any suitable conductive material may be used in place or PEDOT in this disclosure such as carbon allotropes such as CNT and graphene or conductive polymers such as Poly(3,4-ethylenedioxythiophene) or PEDOT (or sometimes PEDT) or metal oxides such as zinc oxide or indium tin oxide (ITO), indium zinc oxide (IZO), aluminum zinc oxide (AZO) or gallium zinc oxide (GZO).

Combining capacitive and force sensing resistor sensors provides a hybrid sensor with a z-axis depth of field sensitivity permitting gesture sensing with capacitance reacting to the approaching finger activator, then the FSR responds to applied force of the finger and capacitive sensing again responds as the activating finger is withdrawn from the sensor surface.

The method and apparatus for force sensitive input devices disclosed below are formed as a membrane that is capable of detecting pressure inputs and varying applications of pressure. A transparent or opaque force sensing membrane is formed with carbon nanotubes, conductive polymers, graphene or other conductive or semi-conductive material by using two sheets of a suitable polyester film or other clear or opaque substrate coated with oriented patches of conductive polymer, micro-particle deposits or carbon nanotubes (CNT).

The coating process includes conductive particles or micro-particles such as zinc oxide, carbon or other suitable materials or carbon nanotubes mixed in an aqueous or other solution and deposited using any suitable technique such as aerosol jet deposition, or suitable printing such as screen, flexography, gravure, offset, lithography or other suitable method. The aqueous solution may be an alcohol carrier or other suitable liquid and may also include one or more additives such as a suitable ionomer to bind the CNT to prevent the CNT from passing through human skin or lung membranes. The clarity or light transmission of a transparent force sensing membrane is rated at about 92%, which to the human eye seems like looking through clear glass. Higher resistance of the conductive particle patches improves the light transmission through the sensor. Alternatively, conductive polymer patches such as PEDOT or other suitably conductive polymer may be used to form force sensing resistor (FSR) patches.

Depositing conductive particles, or other suitable semiconductive particles such as CNT, as oriented patches on apposing surfaces of parallel membranes forms FSR elements. A user's input contact with the sensor surface is detectable when the conductive particles, tubes, wires or polymer elements in apposing patches are forced into contact with each other and with the conductive traces when the input force is applied. The more force, the more conductive elements make contact allowing the electrons to travel from one conductive trace through the contacting FSR CNT patches to a perpendicular conductive trace. Higher force also increases the contact area between the substrates that also increases conductance between conductive elements in contact on each substrate.

A small area of contact between apposing patches and their conductive traces is made when an actuator (the device that touched the sensor surface) such as a human finger makes initial contact with the sensor. As force is increased the area of contact increases bringing more particles into play and thus increasing the conductivity of the device.

A suitable force sensing membrane is made using two parallel substrates. A first substrate has rows and columns of conductive traces formed on a first side of the substrate. Where the column traces intersect the row traces, the column traces are interrupted by forming an electrical connection through the substrate from the first side to the second side and crossing the row trace and then again forming an electrical connection from the second side of the substrate to the first side of the substrate and connecting with the interrupted column trace.

Alternatively, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited FSR elements such as patches of conductive material such as CNT. When the substrates are oriented parallel with the first sides in apposition, the patches of the conductive material align over a column trace and a short leg trace such that pressure on the membrane causes one or more conductive patches to engage a column trace and a short leg trace forming a force sensitive resistance circuit.

A trampoline sensor as described below provides a hybrid force sensing membrane which is secured along its perimeter over on opening sized and shaped to correspond to the size and shape of the force sensing membrane. A user applying force input to the sensor membrane does not encounter a hard surface beneath the sensor membrane. Instead the sensor membrane operates like a trampoline providing an increased travel when a force is applied with no hard feel at the end of the sensor travel. A trampoline sensor may also include hybrid capacitive input sensing as described below.

Force-sensing resistors date back to Eventoff patents, U.S. Pat. Nos. 4,314,227, 4,314,228, etc. which disclose two basic FSR configurations, the "ShuntMode and ThruMode." Both configurations are constructed with various formulations of force-sensing-resistor inks. Typically the solvent based ink is screen printed and cured on any suitable substrate from glass to polyester films or any other suitable compounds to makes a force-sensing resistor element, however any other suitable methods of deposition or printing may also be used.

These and other features and advantages will become further apparent from the detailed description and accompanying figures that follow. In the figures and description, numerals indicate the various features of the disclosure, like numerals referring to like features throughout both the drawings and the description.

BRIEF DESCRIPTION OF THE DRAWINGS

FIG. 1 is a schematic of a portion of a force sensor array.

FIG. 2 is an exploded block diagram of the elements of a force sensing element of the force sensor array of FIG. 1.

FIG. 3 is an oriented layout diagram of the elements of FIG. 2.

FIG. 4 is a cross section diagram of the force sensor assembly including the force sensing array of FIG. 1 taken along A-A.

FIG. 5 is a schematic circuit diagram of a force sensing assembly.

FIG. 15A is a side view of a conductive peg and cooperating FSR packaging.

FIG. 15B is a close-up view of the pre-loaded FSR sensor of FIG. 15A taken along A-A.

FIG. 16 is a front perspective of the conductive peg and FSR sensor of FIG. 15B.

FIG. 17 is a schematic diagram of the circuit formed using the apparatus of FIG. 15A.

DETAILED DESCRIPTION OF THE INVENTIONS

Figure 6:
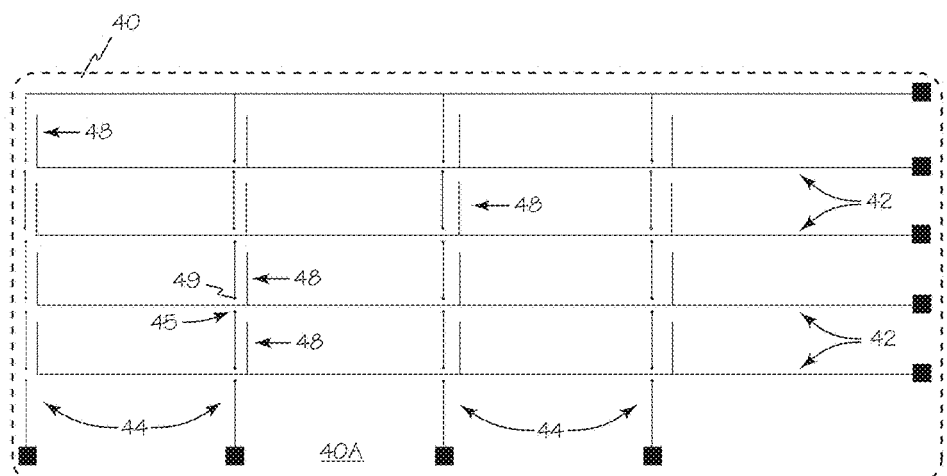
FIG. 6 is a layout diagram of a portion of a single layer conductive trace arrangement.
Figure 7:
FIG. 7 is a layout diagram of conductive FSR patches for use with the conductive trace arrangement of FIG. 6.

Referring now to FIG. 1, force sensing assembly 10 includes force sensor array 11 which is formed from one or more force sensing resistor assemblies such as FSR assemblies 12, 14, 16 and 18. Each FSR assembly is oriented between parallel rows of conductor traces on each substrate such as first traces 19 and second traces 21. FSR performance may be improved by including a highly conductive pad or patch between the substrate and each FSR patch.

A force sensing assembly may be formed using two parallel substrates such as first substrate 22 and second substrate 23 as illustrated in FIGS. 2, 3 and 4. First substrate 22 has parallel conductive traces 19 printed along with a conductive leg such as leg 12A for each FSR assembly such as FSR assembly 12. Second substrate 23 has parallel conductive traces 21 printed along with a conductive leg such as leg 12B for each FSR assembly such as FSR assembly 12. When first substrate 22 and second substrate 23 are properly aligned with the deposited traces and patches in apposition, first conductive traces 19 are oriented perpendicular to second perpendicular traces 21. Near each conductive leg on each substrate, an FSR patch such as patch 24 and patch 25 are deposited. Insulating elements or pads such as insulator pads 26 are deposited on either substrate over the conductive traces at the points where the corresponding conductive trace on the other substrate would be in contact when the substrates are aligned in apposition as illustrated in FIGS. 3 and 4. Insulating elements 26 separate the first conductors from the second conductors. Optional, highly conductive patches may be deposited between each FSR patch and the substrate that supports it. For example, highly conductive patches 24B and 25B may be deposited between FSR patches 24 and 25 and substrates 22 and 23 respectively.

Controlling the dynamic range, the measured resistance of an FSR circuit as a function of applied force on the sensor, is possible by controlling the size and texture of the conductive patches or electrodes as well as the spacing between the electrodes on the sensor substrates as well as the pre-load holding the substrates in contact without user input force. For example, using the aerosol jet deposition method to form the electrodes or patches, such as patches 24 and 25 of FIG. 4 or conductors 44 and 48 of FIG. 9, a second layer, layer 27, of small dots or dashes 27A or other shapes over the base conductor electrode may be applied in an effort to emulate the texture of a thick-film silver and FSR deposition. A thick-film FSR has a better dynamic range when used in conjunction with a thick-film silver electrode with few small conductive peaks or spots as opposed to using a "flat" conductive trace. Having too many spots or peaks causes the electrode to behave similar to a smooth flat conductor. In addition, pre-loading or compressing the substrates into a normal state of contact such as illustrated in FIGS. 13B and 14. This contact state, or pre-load state may form the lower threshold for switch or sensor closure thus eliminating low contact noise and inconsistencies between sensors. Pre-loading an FSR also reduces the dynamic range of the sensor.

Referring now to FIG. 4, first substrate 22 has first conductive traces such as traces 19A and 19B, conductive leg 12A and first FSR patch 24 deposited on a first surface such as conductor surface 22A. Second substrate 23 has second conductive traces such as traces 21A and 21B, conductive leg 12B and second FSR patch 25 deposited on a first surface such as conductor surface 23A. Each substrate has a corresponding second surface such as second surfaces 22B and 23B respectively. When two printed substrates are aligned in parallel, the first surfaces of each substrate are aligned in apposition with the parallel traces on each substrate oriented perpendicular to the conductive traces of the apposing substrate yielding a force sensing assembly such as force sensing assembly 10 with the second surfaces of each substrate operating as a contact surface for the application of force to be detected and measured.

In use, pressure on the second surfaces 22B or 23B of either first or second substrate at or near an FSR assembly such as FSR assembly 12 will create a force sensitive circuit such as circuit 30 of FIG. 5 that extends from first conductive trace 19A to second conductive trace 21A through the three resistive elements described below. First resistive element 3132 is formed by the interaction of a portion of second FSR patch 25 with conductive leg 12A. Second resistive element 33 is formed by the interaction of a portion of first FSR patch 24 with second FSR patch 25. Third resistive element 34 is formed by the interaction of a portion of first FSR patch 24 with conductive leg 12B. The resistance value of each resistive element is proportional to the pressure applied to the substrate and the location of the pressure.

Referring now to FIGS. 6, 7, 8 and 9, an array of force sensor assemblies may be formed using two parallel substrates, such as substrates 40 and 41. First substrate 40 has rows and columns of conductive traces such as row traces 42 and column traces 44 formed on first side 40A of the substrate. Where the column traces intersect the row traces, such as intersection point 45, the column traces are interrupted by forming an electrical connection through the substrate from first side 40A to second side 40B and crossing the row trace with a jumper trace such as jumper trace 47 and then again forming an electrical connection such a connection 49 from second side 40B of the substrate to first side 40A of the substrate and reconnecting with interrupted column trace 44.

Electrical connection 49 may be formed using any suitable technique. A useful technique for forming electrical connection 49 when the majority of conductors are deposited using printing methods is accomplished by adjusting the viscosity of the conductive liquid being deposited to permit the conductive liquid to flow in and through a hole, such as hole 46 formed between first side 40A to second side 40B.

Alternatively, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited FSR elements such as patches of conductive material such as CNT. When the substrates are oriented parallel with the first sides in apposition, the patches of the conductive material align over a column trace and a short leg trace such that pressure on the membrane causes one or more conductive patches to engage a column trace and a short leg trace forming a force sensitive resistance circuit.

Figure 8:
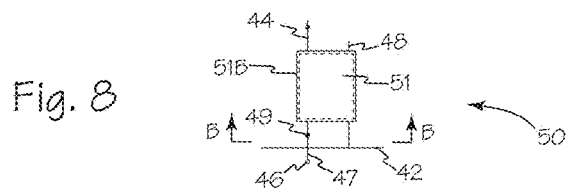
FIG. 8 is a top view of a single force sensor conductive patch and its corresponding traces.
Figure 9:
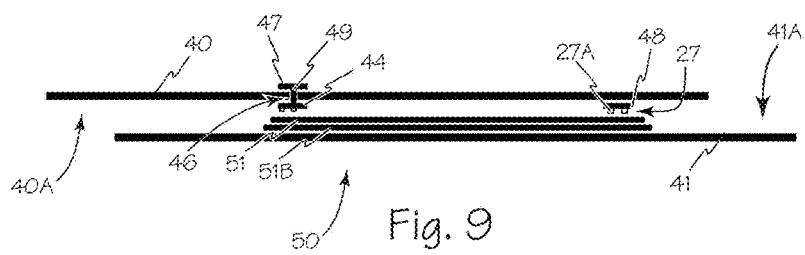
FIG. 9 is a cross-section view of the force sensor of FIG. 8.
Figure 10:
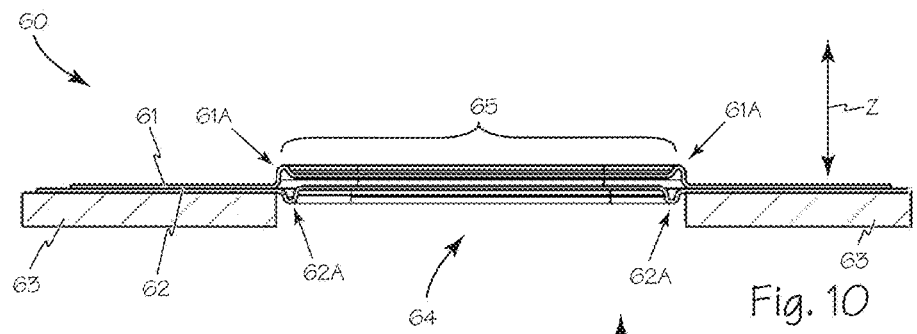
FIG. 10 is a cross-section view of a trampoline force sensor.
Figure 11:
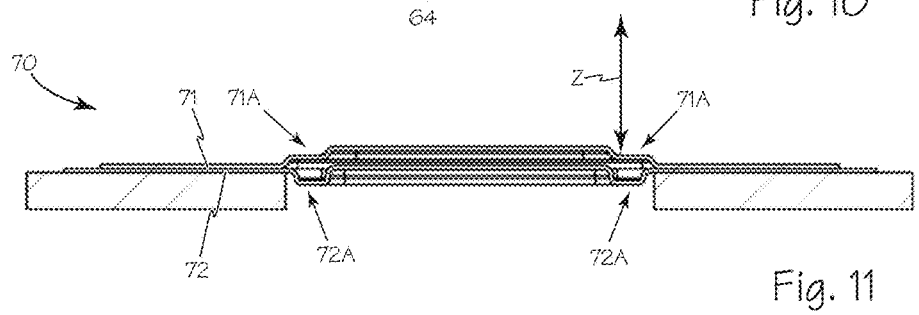
FIG. 11 is a cross-section view of an alternate trampoline force sensor.

Parallel to the column traces are short conductor leg traces such as leg traces 48. An array of force sensing assemblies such as force sensing assembly 50 is formed with an array of patches such as conductive patch 51 are deposited on first side 41A of second substrate 41. Highly conductive backing patches such as patches 51B may first be deposited on substrate 41 and FSR conductive patches such as patch 51 may be deposited on the highly conductive backing patch to improve FSR performance. FSR elements or patches such as conductive patch 51 include conductive material such as CNT or PEDOT. When substrates 40 and 41 are oriented parallel with first sides 40A and 41A in apposition, the conductive patches such as patch 51 align over an interrupted column trace and a short leg trace as illustrated in FIGS. 8 and 9 to form force sensing assemblies such as force sensing assembly 50. In use, pressure on the membrane causes one or more conductive patches to engage a column trace and a short leg trace forming a force sensitive resistance circuit as discussed above.

Alternatively, substrate 41 may not have a plurality of conductive or semi-conductive patches such as patches 51, instead having a single flood layer of conductive or semi-conductive material deposited on substrate 41 with the conductive area apposing parallel conductors forming a force sensing assembly.

Force sensing membranes as discussed, and pre-loaded force sensing membranes may also benefit from a trampoline configuration such as illustrated in FIGS. 10, 11, 13A, 13B and 14. Force sensor 60 is formed with two parallel substrates such as first and second substrates 61 and 62 as discussed above. Each substrate may be planar or may be shaped to form a flexible section such as sections 61A and 62A respectively to optimize sensor movement along the z-axis. Each substrate containing one or more FSR elements such as conductive deposits and or traces to form a force sensing resistor to quantify the location and intensity of force applied to the active area of the sensor. Sensor support 63 includes openings such as opening 64 sized and dimensioned to correspond to active area 65 of force sensor 60.

Force sensor 60 may be formed with the force sensing elements on each substrate oriented to provide one or more different active areas corresponding to each force sensing element. Multiple openings in sensor support 63 are formed with each opening collocated with a force sensing element Force sensor 70 is formed with two parallel substrates such as first and second substrates 71 and 72 as discussed above. Each substrate is shaped to form a flexible section such as sections 71A and 72A respectively to allow sensor movement along the z-axis. Each substrate containing one or more FSR elements such as conductive deposits and or traces to form a force sensing resistor when force is applied to the active area of the sensor.

Figure 12:
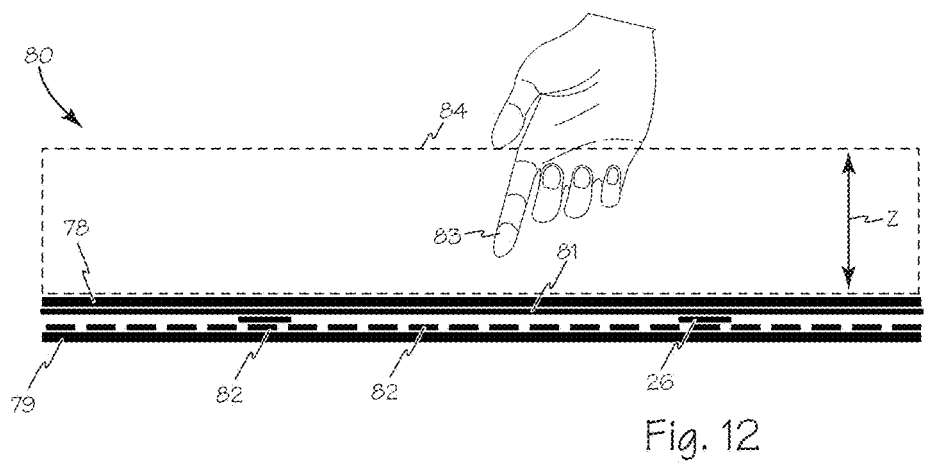
FIG. 12 is a cross-section view of a capacitive force sensor.

Referring now to FIG. 12, First conductive layer 78 and second conductive layer 79 of force sensing resistor 80 may also be used as elements of a capacitive sensor to sense the presence and location of a user's stylus, hand, finger or other conductive apparatus or appendage along the z-axis. Conductive area 81 is deposited on first conductive layer 78 and conductive traces 82 are deposited on second conductive layer 79 to form a force sensing resistor. A voltage applied across the conductive layers creates a capacitive sensor reactive to a conductive appendage such as finger 83 in sensor space 84.

Figure 13A:
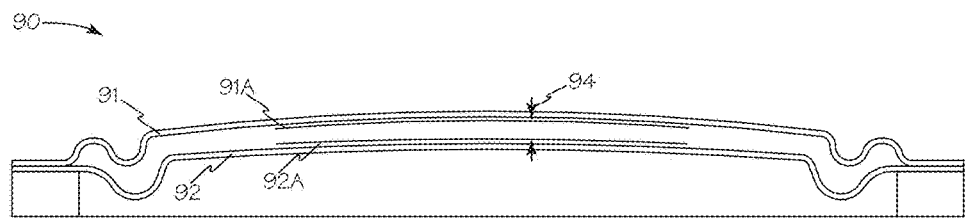
FIG. 13A is a cross-section view of an FSR sensor before pre-load.
Figure 13B:
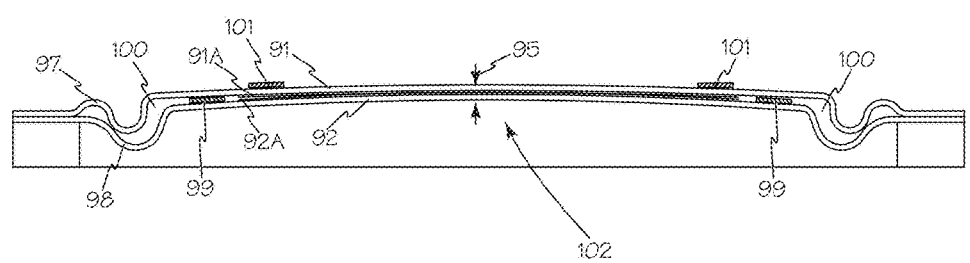
FIG. 13B is a cross-section view of an FSR sensor after pre-load.
Figure 14:
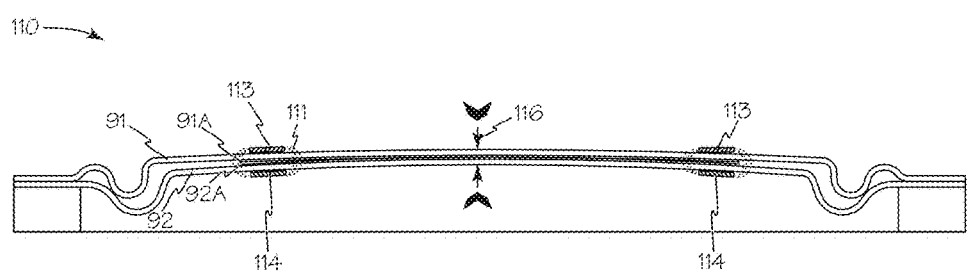
FIG. 14 is a cross-section view of an FSR sensor with external pre-load applied.

Referring now to FIGS. 13A and 13B, sensor 90 is a force sensing resistor as described above and includes substrates 91 and 92 with conductive contacts 91A and 92A deposited thereon respectively and optional highly conductive backing contacts as well. Generally, substrates 91 and 92 are oriented with conductive contacts 91A and 92A in apposition with some separation 94 between the conductive contacts as shown. Pre-loading of the substrates as illustrated in FIG. 13B brings conductive contacts 91A and 92A into a pre-determined level of contact which is determined by pre-load force 95. In this configuration, pre-load force 95 is controlled by first and second embossed edges 97 and 98 respectively.

Alternatively, pre-load force 95 between first substrate 91 and second substrate 92 may be generated by an adhesive layer 99 between the substrates, or by drawing a vacuum in space 100, or by installing a fixed weight or weights 101 on first substrate 91 to use gravity to urge the substrates into pre-load position 102. These configurations for achieving FSR pre-load are fixed during manufacture and present little opportunity to change or adjust the intensity of the pre-load force during use.

Referring now to FIG. 14 FSR sensor 110 is pre-loaded using magnetic field 111 between first or upper magnet 113 and any suitably oriented ferrous material such as second or lower magnet 114. The size of the magnets and the strength of field 111 permits control of pre-load force 116. Magnets 113 and 114 may be fixed magnets for providing a fixed pre-load, alternatively, either or both of the magnets may be electro magnets enabling controllable variation in pre-load force 116. If the electro-magnet may also be configured to create a repulsive force to set a negative pre-load of offset that must be overcome to engage the FSR. Similarly, either first magnet 113 or second magnet 114 may be replaced by suitable ferrous material to interact with the remaining magnet or electro-magnet.

In some FSR configurations, the conductive electrodes deposited on the substrates may be made magnetic to achieve a pre-load between the substrates. Alternatively, the ink used for the FSR conductive patches may be made magnetic to create the pre-load.

Pre-loaded FSR sensors may be incorporated into or on merchandise packaging to assist in minimizing theft. Referring now to FIGS. 15A, 15B and 16, pre-loaded FSR sensor 120 is incorporated into merchandise packaging 121. Merchandise may be displayed and supported by pegs, rods, hooks or other devices such as peg 122 which is supported on a merchandise display rack such as rack 123. Peg 122 includes one or more conductive elements such as electrodes 124 and 126 which are connected to any suitable merchandise security system such as system 125. Merchandise packaging 121 is cut and shaped to form a tab such as tab 127 which functions as a leaf spring which provides elastic support for packaging 121 and any attached merchandise. Tab 127 is configured to enable the weight of packaging 121 and the attached merchandise to preload the FSR. Tab 127 has a first side 127A and a second side 127B. Second side 127B serves as a substrate for conductive FSR patch 128 which may be formed and deposited as discussed above.

When merchandise packaging is displayed as illustrated in FIG. 15A, circuit 129 of FIG. 17 formed by FSR patch 128 and electrodes 124 and 126 is pre-loaded by the spring action of tab 127. The pre-load enables circuit 129 to react to a change in the resistance of the circuit caused by movement of packaging 121 which may or may not be caused by a legitimate purchaser.

The high price of silver makes large format and high volume FSR membrane sensors very expensive, and in many cases because of the expense, pushes some products out of consideration—especially large format devices. Alternatively, conductors may be formed using metal deposition of any suitable metal on polyester film. This is an additive system using resist material like fluoride oil to create specified shapes. As a result it is estimated that as much as an 80% cost reduction can be realized.

For example, oil is printed on PET substrate and then the PET is put through a metalizer, where the metal such as aluminum is atomized for deposition on the PET substrate. The atomized metal only adheres to the PET substrate where there is no oil. After metal deposition the oil is removed using any suitable technique and then a highly conductive ink is printed over the metalized PET and then the FSR is printed over the conductive ink.

An alternate method is a subtractive system where a "de-metalizer" resist ink is printed on portions of a full sheet of metalized PET (aluminum or other metal on PET or other substrates). Wherever the de-metalizer resist ink is printed, the deposited aluminum remains when metalized PET is dipped in a bath of sodium hydroxide (11-12 PH) or other suitable demetalizing solution. This technique may be used in very high volume production of FSR sensors.

The process of producing FSR sensors on a flexible metalizer polymer substrate may utilize two electronically functional inks, a UV and a solvent-based ink that have dual functions. The inks resist the de-metalizing solution, while at the same time are unique in that they are loaded with carbon/graphite blend making the chemical resist blend highly conductive. The ink not only protects the metalized PET, but serves to heal any scratches, making for a better contact surface at termination, and increases conductance to the thin layer of aluminum or other metal that is deposited on the substrate. Additionally, a force sensing resistor ink is printed over the conductive ink to add the Z dimension to the function.

The metalized PET is very flat. Adding the conductive particles to the ink creates a rougher topography, which adds to the dynamic range of the force sensing resistor as discussed above.

Added benefits have been realized from this effort. When making a ThruMode FSR two substrates are used. Either one or both have FSR ink deposited over conductor pads. Typically silver is used for the conductor pad. The two substrates are oriented with the FSR over the conductor pads on each substrate and face each other. The topography of the silver flake is transferred "Thru" to the FSR layer causing a topography of many thousands of peaks and valleys. This can be beneficial in increasing the dynamic range of an FSR.

Figure 18:
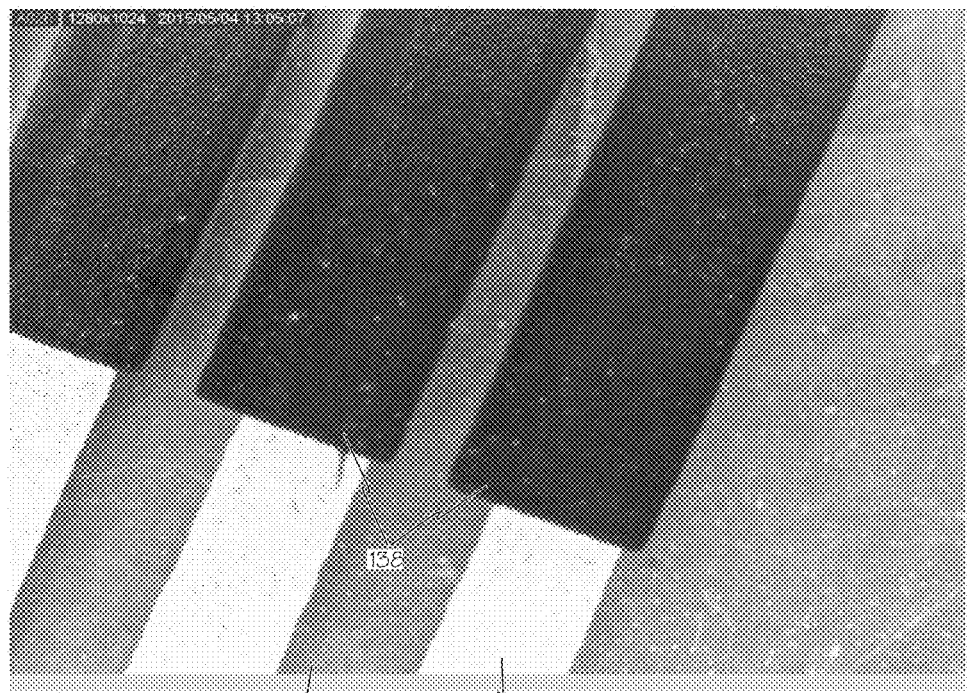
FIG. 18 is a photograph of metal conductors deposited on a polyester sheet substrate.
Figure 19:
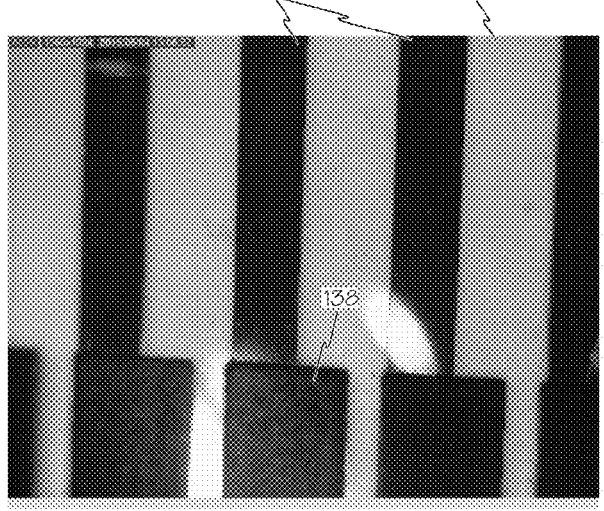
FIG. 19 is a photograph of the FSR pads printed over metal conductors deposited on a polyester sheet substrate.

Referring now to FIGS. 18 and 19, using polyester film such as PET film 136 with metal conductive layer 137 results in a relatively flat conductor with a fine topography with minimal peaks and valleys and FSR layer 138 is deposited as an overcoat. The topographic peaks and valleys are much finer with the smaller pigment size used to make the FSR ink rather than the larger flakes used to make silver inks.

A carbon layer is used to replace silver. The carbon layer includes larger particulate matter as a cost reduction and improves the dynamic range of the sensor due to the larger particulates. Additionally, the sensor's dynamic range can be extended by mechanically introducing a topography to the substrate by micro embossing peaks.

With the metalized polyester film FSR system higher resistance FSR ink is used to regain some of the dynamic range, but also use a threshold level in the software system to create an adjustable threshold point of contact.

With this approach the sensor will be preloaded with a very high resistance value. This high resistance level is sufficiently close to an open circuit as to avoid the need for a traditional and more costly mechanical spacer such as dielectric spacer dots.

Figure 25:
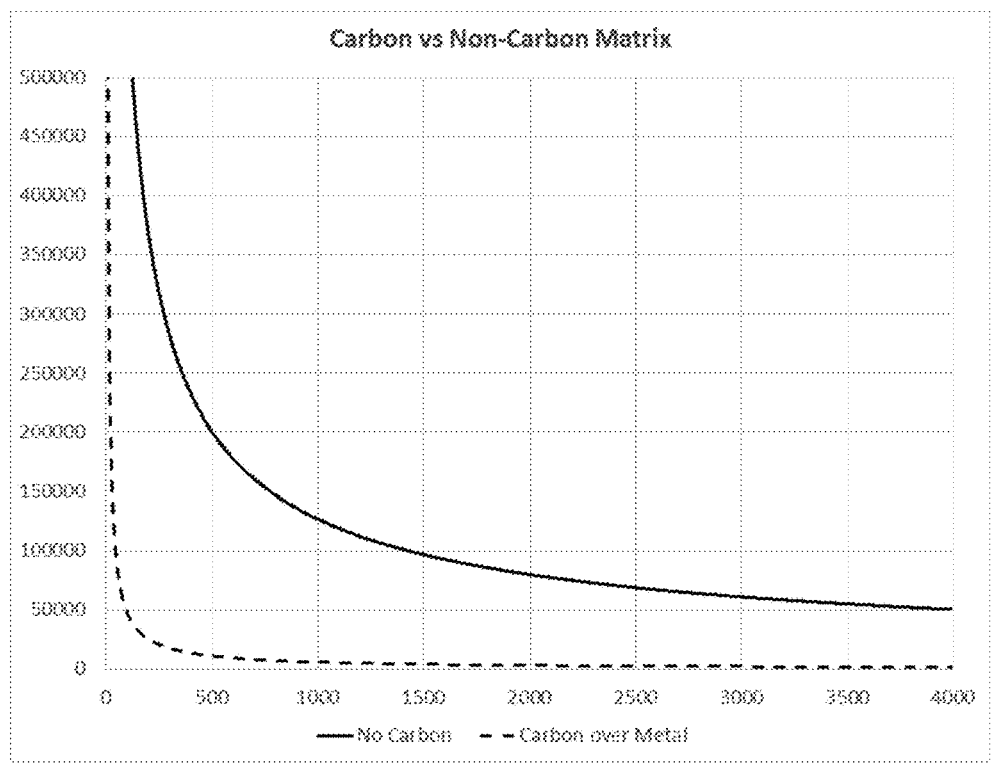
FIG. 25 is a graph illustrating the behavior of a carbon vs. non-carbon matrix applied to a metalized substrate.

Referring to FIG. 25, the FSR layer over the metalized polyester sheet also heals any fissures in the metal coating and retains continuity. The carbon layer has another function as well. When the polyester film is coated with the carbon layer the conductance is increased by an order of magnitude. This is yet another control parameter when formulating the final value of the sensing system.

The resin of the carbon that forms the FSR will prevent or at least limit oxidation of the deposited metal layer. The carbon layer will also improve the contact of all sensing lines to an attached printed circuit board when using conductive Z axis PSA like 3M's 9703 or Fuji Zebra strips (alternating conductive/dielectric rubber binder).

The size of the anilox footprint over the flat polyester film effects the dynamic range of the sensor. There is more control of the dynamic range because the polyester film is so flat that the topography may be controlled by changing the anilox. A smaller anilox layer will show less dynamic change or force delta than a coarser anilox layer, thus another means of controlling the dynamic range of the FSR.

Furthermore, using a high resistance FSR without dielectric spacer dots and using a prescribed durometer and radiused elastomeric actuator will increase the sensitivity for detecting low weight objects, while also linearizing the output and extending the saturation point for higher weights. As force increases the prescriber radius is designed to linearly increase the area of contact and linearly increase the conductance of the output. The increased dynamics of a higher resistance FSR allow for a threshold value to be reached while still having plenty of dynamic delta. The lack of the spacer allows for very light activation forces to be detected, and the higher resistance FSR will not saturate as quickly as a more conductive FSR. The combination of no dots, higher resistance FSR, and the use of correctly shaped actuators of the appropriate durometer for the job, will yield the best dynamic range for a sensor capable of detecting a wide range of forces.

These principles of actuator design may be applied to multi-sensor Matrix Arrays as well. For Matrix Arrays, dome actuators may be formed on sheets, with the pattern of actuators matching the pattern of the sensors. Additionally, the same principles may be employed in the design of spacer dots to realize similar improvements in sensor dynamics under high forces.

Figure 26:
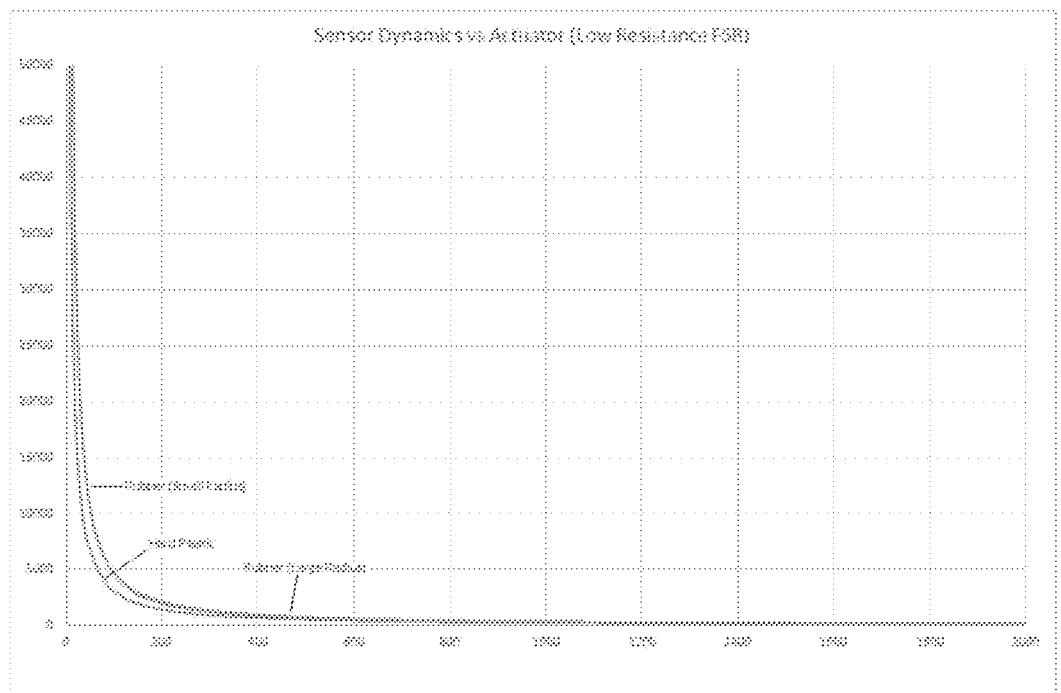
FIG. 26 is a graph illustrating the dynamics of a sensor with a low resistance FSR.
Figure 27:
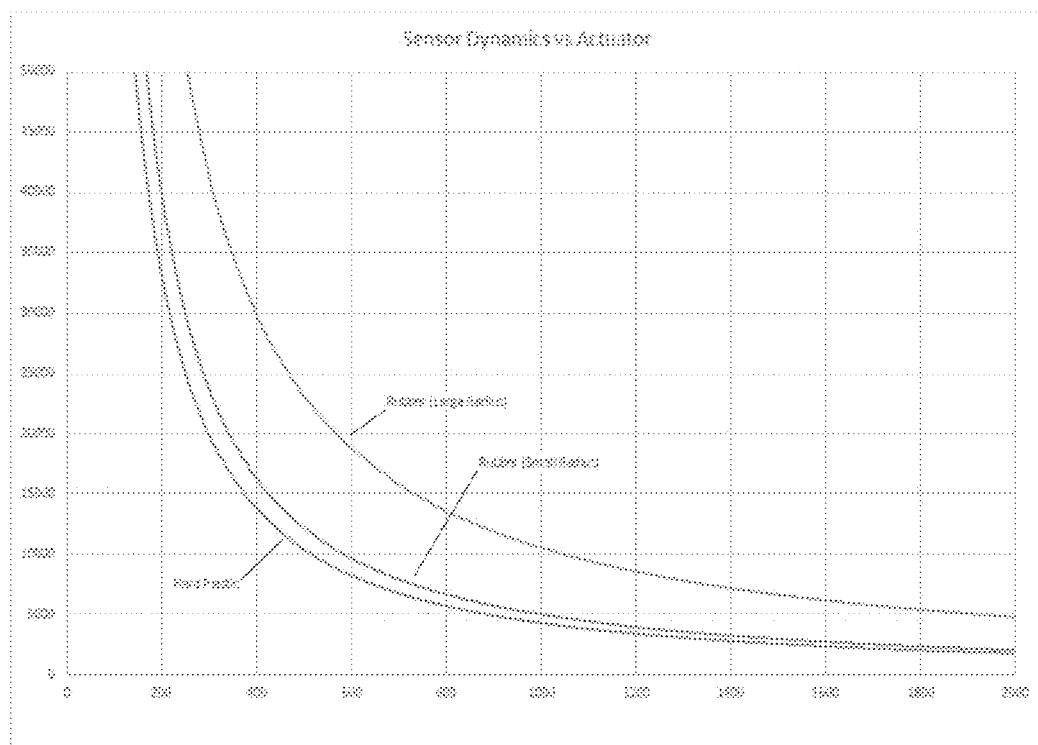
FIG. 27 is a graph illustrating the dynamics of a sensor with an alternate FSR.

FIGS. 26 and 27 illustrate the results of the aforementioned discussion.

Figures 20, 21:
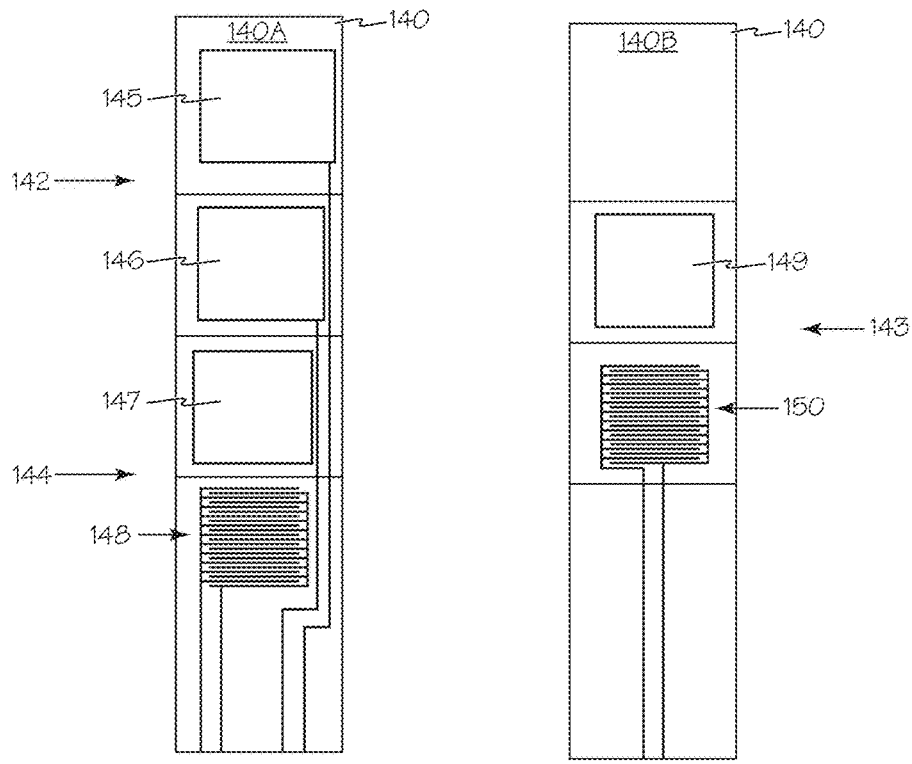
FIG. 20 illustrates the first side of a FSR sensor assembly composed of three different FSRs formed on a single substrate that is folded to create the sensors.
FIG. 21 illustrates the second side of the FSR sensor assembly of FIG. 20.
Figure 22:
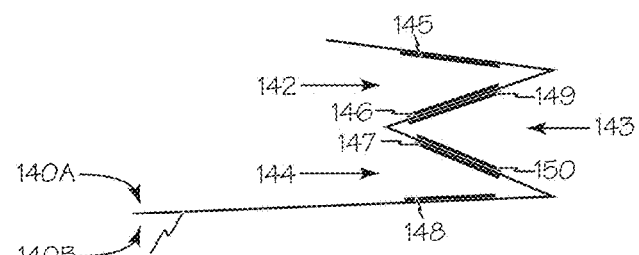
FIG. 22 illustrates a side view of the sensor assembly of FIGS. 20 and 21 folded to form the multiple sensors.

Referring now to FIGS. 20, 21 and 22 increasing the range of the sensor can be accomplished by using multiple force sensors in a single assembly. For example, a high resistance, medium resistance and low resistance force sensor may be formed on a single substrate and folded to create a stacked arrangement as the substrate is folded.

Substrate 140 has a first side 140A and a second side 140B. FIG. 20 illustrates first side 140A and FIG. 21 illustrates second side 140B. FIG. 22 illustrates FSR assembly 141 in a folded configuration to create first FSR 142, second FSR 143 and third FSR 144 by folding substrate 140.

First FSR sensor 142 is composed of first conductive layer 145 and second conductive layer 146 which form a "shunt mode force sensing resistor." Second FSR sensor 143 is composed of conductive layer 147 and trace layer 148. Third FSR sensor 144 is composed of conductive layer 149 and trace layer 150. Substrate 140 is folded as illustrated in FIG. 22 with first and second conductive layers 145 146 in apposition to form first FSR sensor 142, conductive layer 147 and trace layer 148 in apposition to form second FSR sensor 143 and conductive layer 147 and trace layer 148 in apposition to form third FSR sensor 144.

In the case of the folded system, the low resistance sensor is activated first with appropriate spacer separator. As force is increased, the second, or medium range force sensor is activated, and finally with increasing force applied to sensor assembly 141 the high resistance force sensor is activated. Any suitable combination of "shunt mode" and "thru mode" sensors may be used.

The objective is to employ only the most dynamic response range of each force sensor, which is in the "belly" of the output curve and seamlessly connect the three (or more) sensors in software as force is increased.

Figure 23:
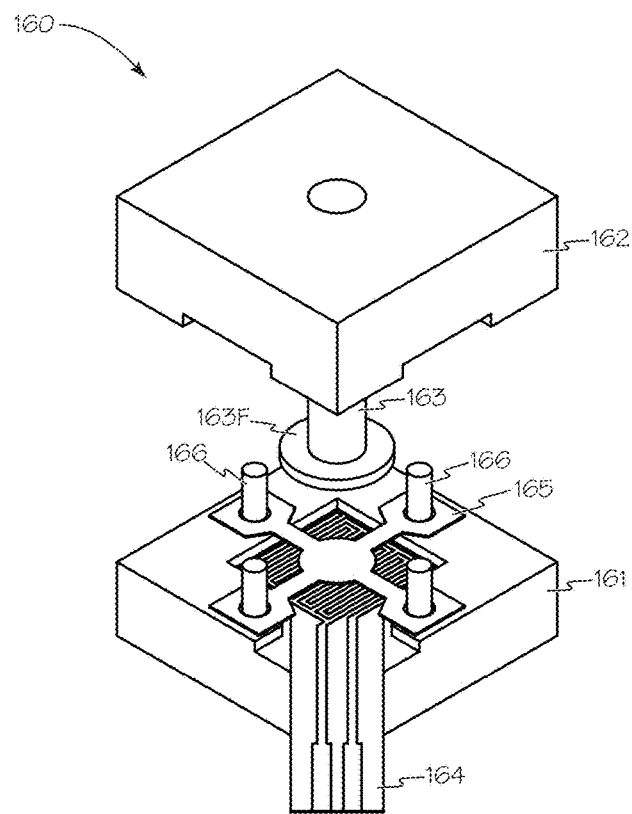
FIG. 23 is an exploded perspective view of an alternate trampoline FSR sensor.

FIG. 23 illustrates a trampoline sensor with an alternate configuration to the trampoline sensors of FIGS. 10, 11, 13A, 13B and 14. Trampoline sensor 160 includes base 161, cover bezel 162, actuator piston 163, first substrate 164 and second substrate 165. Cover bezel 162 includes channel 162X to engage and enable movement of the piston through the cover bezel to apply force to the first and second substrates. Base 161 may be solid to support first substrate 164 or it may be hollow beneath first substrate 164. Base 161 also includes a plurality of pins 166 that engage the cover bezel to secure second substrate 165. Actuator piston 163 may include flange 163F to optimize engagement of contact pad 167 on second substrate 165. First substrate 164 and second substrate 165 each contain one or more conductors and conductive layers as discussed above to enable the combination of the first and second substrate to operate as an FSR sensor.

Figure 24:
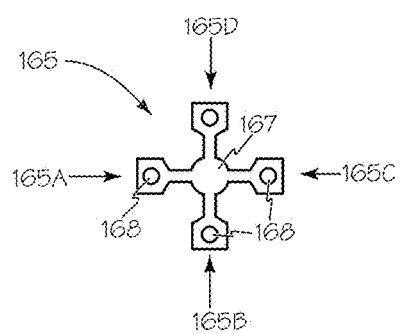
FIG. 24 is a plan view of the second FSR substrate of the sensor of FIG. 23.

Referring now to FIG. 24, second substrate 165 combines the switch/sensor spring return and switch/sensor electronic contacts onto the same substrate, reducing the cost and making the spring response force adjustable with little cost. Second substrate 165 is formed with two or more legs such as legs 165A, 165B, 165C and 165D to provide the spring response. The number and shape of the legs of second substrate 165 may be configured to adjust the required activation force. Each leg such as leg 165A includes a hole such as hole 168 sized to engage one of pins 166. Holes 168 are generally larger than the pin they engage to enable movement of the second substrate during activation of the sensor. Narrow legs require less force to activate the FSR sensor. This construction can also be multi layered and can be constructed as a typical switch, a force sensor, or as a capacitance sensor, as either single or multiple layer stack-ups. These stack-ups can be in combination, i.e. a momentary switch and a force sensor as a dual stackup, or a capacitance, a switch, and an FSR as a tri-stack-up using indexing pins with spacers This same construction offers XYZ or joystick configuration by using four contact points per key.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A force sensing assembly comprising:
a single polyester film substrate having a first side and a second side and a plurality of conductive patches deposited on the first side and on the second side;
wherein the polyester film substrate is operable to be folded to orient pairs of the conductive patches on the first side into contact with each other to form a plurality of force sensing resistor sensors on the first side and to orient pairs of the conductive patches on the second side into contact with each other to form a plurality of force sensing resistor sensors on the second side.

2. The force sensing assembly of claim 1 wherein each conductive patch of the plurality of conductive patches are formed of at least two layers of conductive material.

3. The force sensing assembly of claim 2 wherein the plurality of conductive patches are formed of conductive material selected from the group comprising:
carbon allotropes, conductive polymers or metal oxides.

4. The force sensing assembly of claim 2 wherein the plurality of conductive patches are formed of graphene.

5. The force sensing assembly of claim 2 wherein the plurality of conductive patches are formed of Poly(3,4-ethylenedioxythiophene).

6. The force sensing assembly of claim 2 wherein the plurality of conductive patches are formed of indium tin oxide.

7. The force sensing assembly of claim 1 wherein the plurality of force sensing resistor sensors are stacked.

8. The force sensing assembly of claim 7 wherein the plurality of force sensing resistor sensors each have different sensitivity.

* * * * *